US008321803B2

(12) United States Patent
Benedetti et al.

(10) Patent No.: US 8,321,803 B2
(45) Date of Patent: Nov. 27, 2012

(54) AGGREGATING SERVICE COMPONENTS

(75) Inventors: Fabio Benedetti, Roma (IT); Salvatore D'Alo', Roma (IT); Marco De Santis, Roma (IT); Arcangelo Di Balsamo, Roma (IT); Rosario Gangemi, Roma (IT); Giovanni Lanfranchi, Roma (IT); Scot Maclellan, Roma (IT); Luigi Pichetti, Roma (IT)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/472,926

(22) Filed: May 27, 2009

(65) Prior Publication Data

US 2009/0319951 A1 Dec. 24, 2009

(30) Foreign Application Priority Data

Jun. 19, 2008 (EP) .................................... 08158534

(51) Int. Cl.
*G06F 3/048* (2006.01)
*G06F 3/033* (2006.01)
*G06F 3/14* (2006.01)
*G06F 7/06* (2006.01)

(52) U.S. Cl. ........ 715/769; 715/735; 715/736; 715/764; 715/837; 707/694; 717/120; 717/121; 717/122

(58) Field of Classification Search .......... 717/120–122; 707/694; 715/764, 769, 837, 796
See application file for complete search history.

(56) References Cited

U.S. PATENT DOCUMENTS

| 5,754,179 | A | 5/1998 | Hocker et al. | |
|---|---|---|---|---|
| 6,300,948 | B1 * | 10/2001 | Geller et al. | 715/866 |
| 6,725,452 | B1 * | 4/2004 | Te'eni et al. | 717/168 |
| RE38,865 | E * | 11/2005 | Dumarot et al. | 717/153 |
| 7,043,407 | B2 * | 5/2006 | Lynch et al. | 703/1 |
| 7,249,131 | B2 * | 7/2007 | Skufca et al. | 1/1 |
| 7,337,409 | B2 | 2/2008 | Doblmayr et al. | |
| 7,568,155 | B1 * | 7/2009 | Axe et al. | 715/246 |
| 2002/0054149 | A1 * | 5/2002 | Genise et al. | 345/810 |
| 2003/0195757 | A1 * | 10/2003 | Greenstein | 705/1 |
| 2004/0210909 | A1 * | 10/2004 | Dominguez et al. | 719/316 |
| 2005/0144090 | A1 * | 6/2005 | Gadamsetty et al. | 705/26 |
| 2005/0256833 | A1 * | 11/2005 | Zeng et al. | 707/1 |
| 2006/0031443 | A1 * | 2/2006 | Carpenter et al. | 709/223 |
| 2006/0070007 | A1 | 3/2006 | Cummings et al. | |
| 2006/0085836 | A1 * | 4/2006 | Lyons et al. | 726/1 |
| 2006/0168436 | A1 * | 7/2006 | Campbell et al. | 713/1 |
| 2006/0190482 | A1 * | 8/2006 | Kishan et al. | 707/103 Y |
| 2006/0242101 | A1 * | 10/2006 | Akkiraju et al. | 707/1 |
| 2006/0259906 | A1 * | 11/2006 | Czajkowski et al. | 718/104 |
| 2008/0059214 | A1 * | 3/2008 | Vinberg et al. | 705/1 |
| 2008/0189308 | A1 * | 8/2008 | Sangal et al. | 707/100 |

* cited by examiner

*Primary Examiner* — Tadeese Hailu
*Assistant Examiner* — Eric J Bycer
(74) *Attorney, Agent, or Firm* — Dambrosio & Menon, PLLC

(57) ABSTRACT

Methods, systems, and computer program products for aggregating service components in a data processing system according to predefined aggregation rules. The method includes providing a plurality of visual elements, each visual element representing a corresponding service component; selecting a new visual element for addition to an aggregation structure; determining a set of eligible visual elements of eligible service components among the instantiated service components; associating a visual cue with the eligible visual elements; and aggregating the new service component to a selected eligible service component in the aggregation structure. The new service component is compatible for aggregation with each eligible service component according to the aggregation rules. The aggregation structure includes an aggregation of instantiated visual elements of instantiated service components to define an aggregated service according to the aggregation of the instantiated service components.

13 Claims, 17 Drawing Sheets

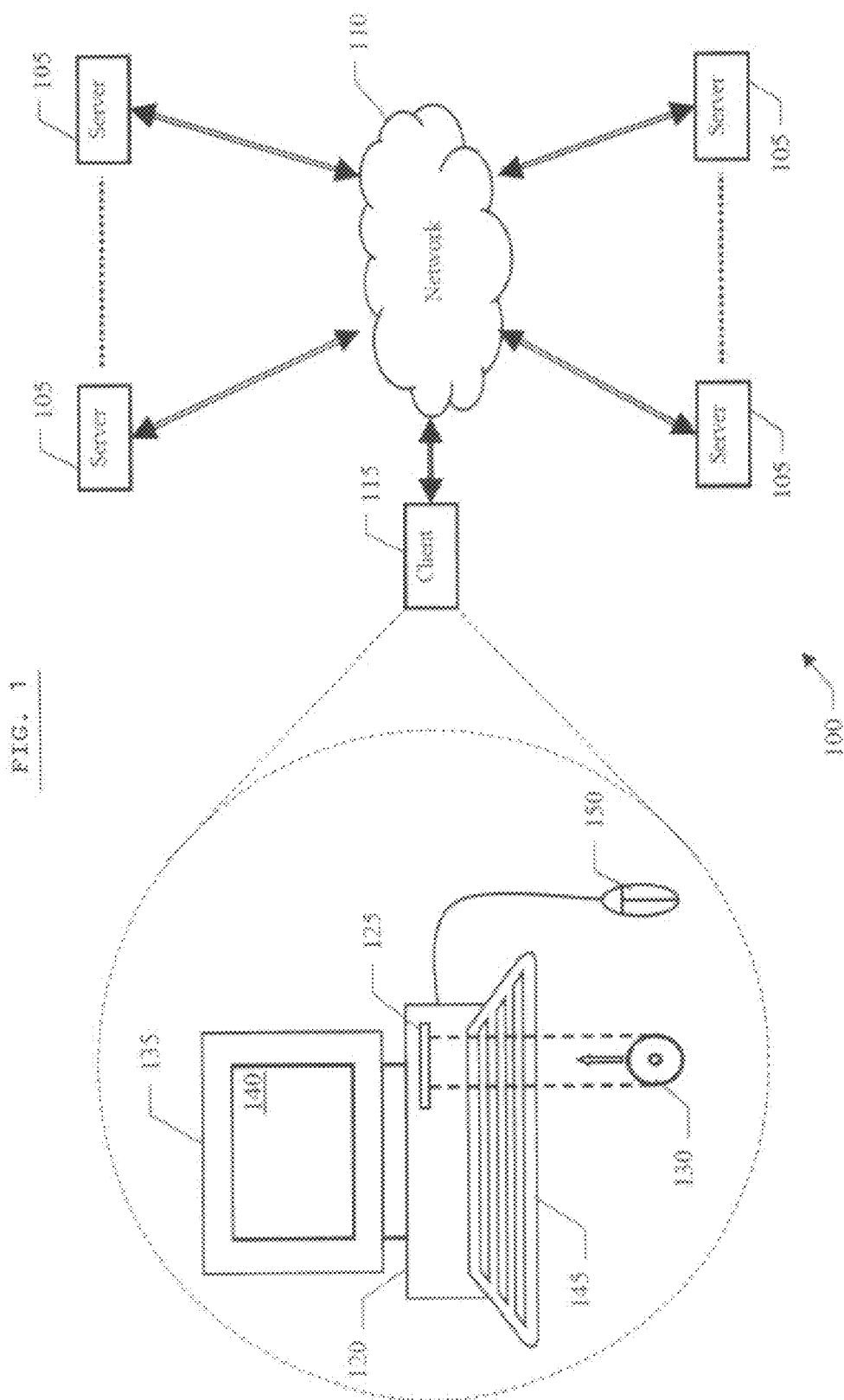

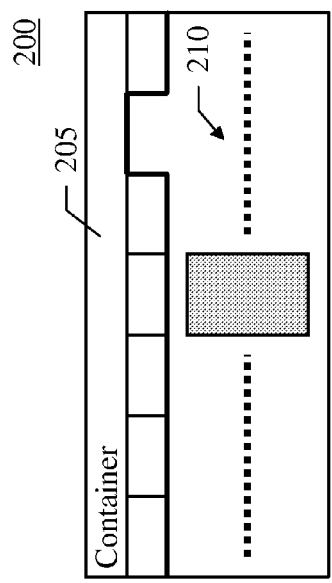
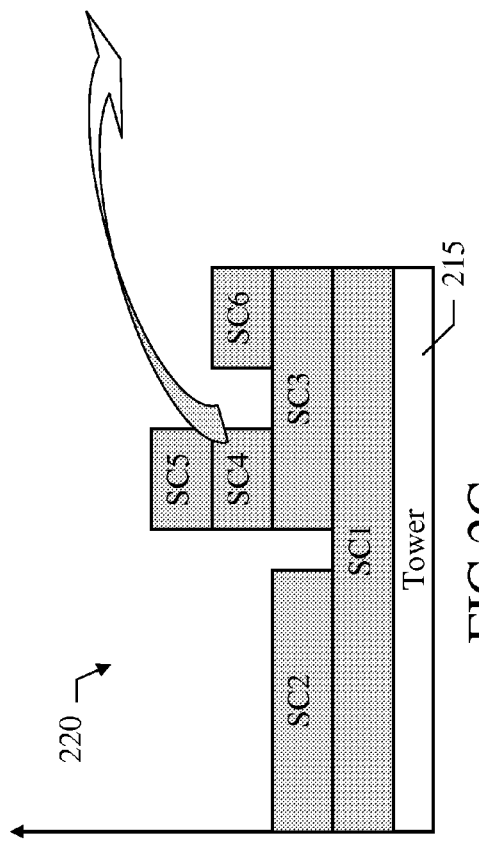
FIG.2G
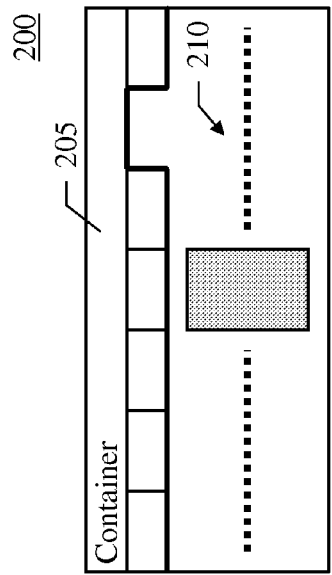
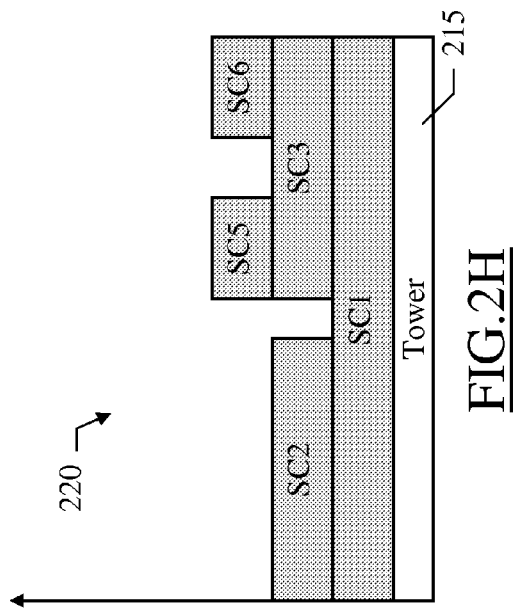
FIG.2H

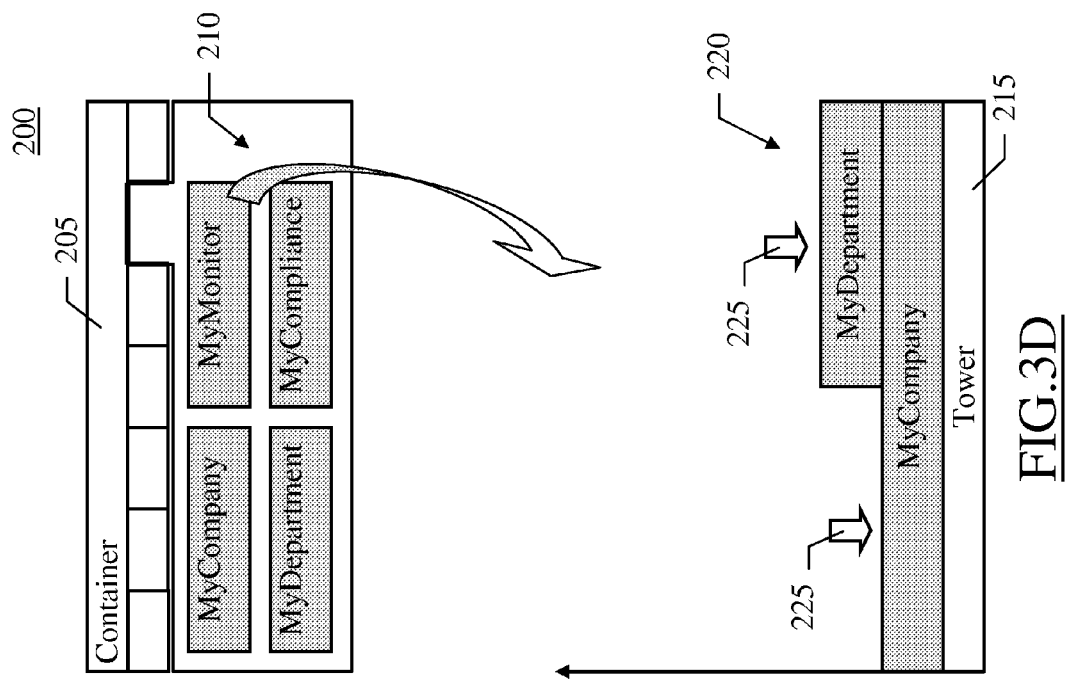
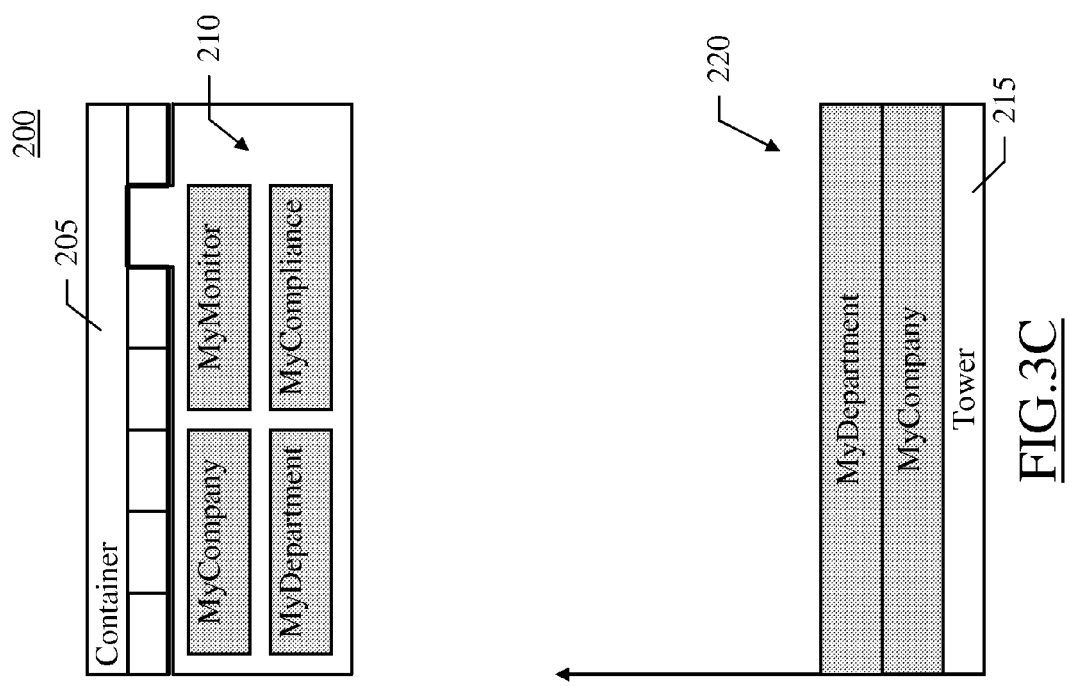

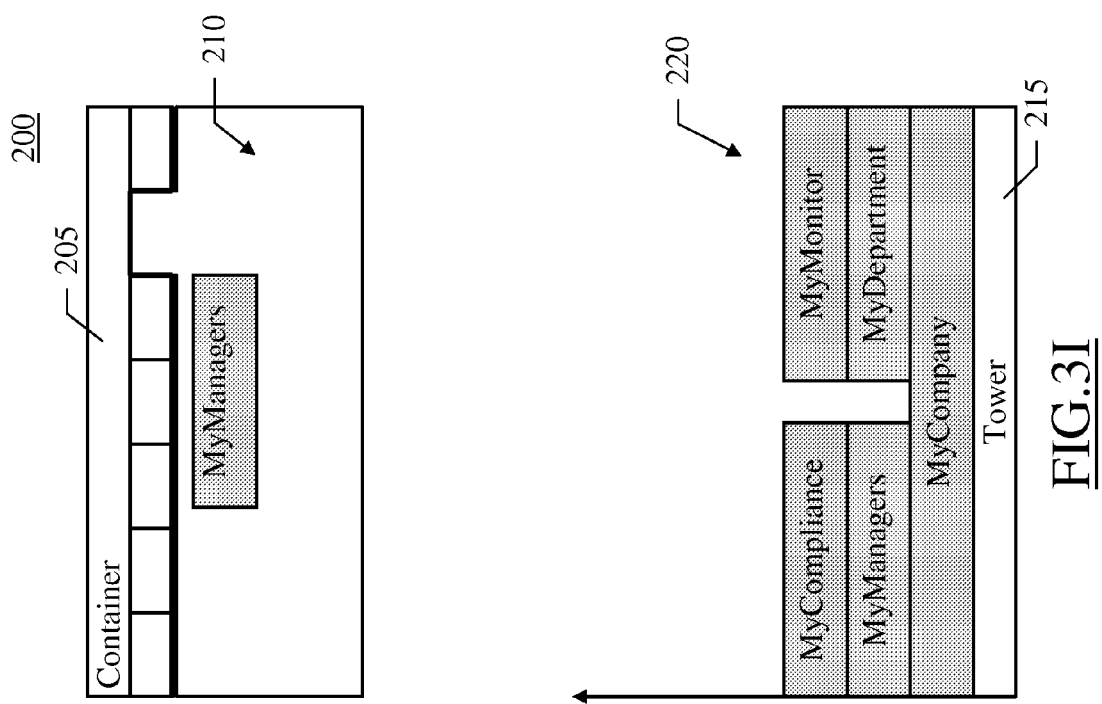

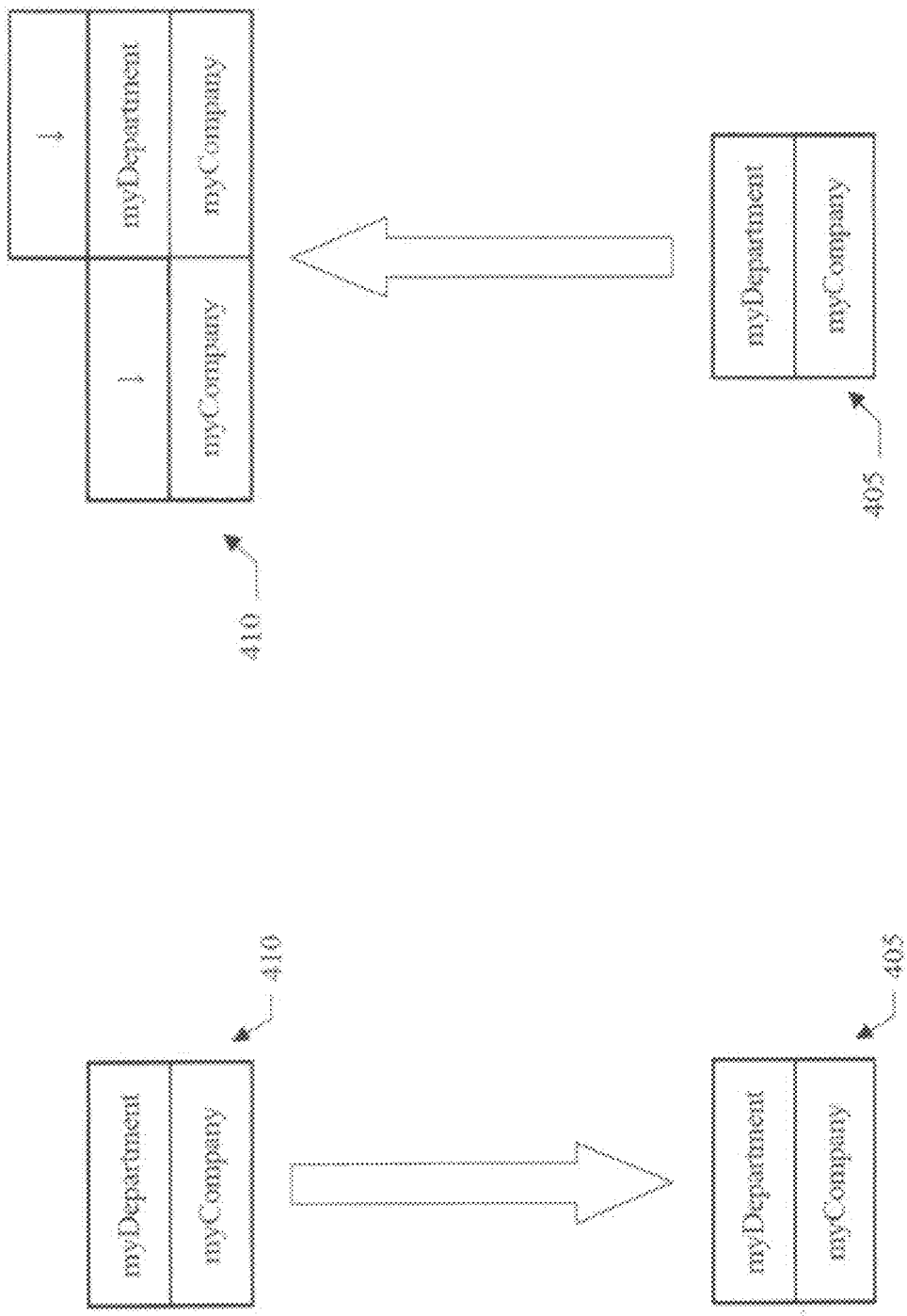

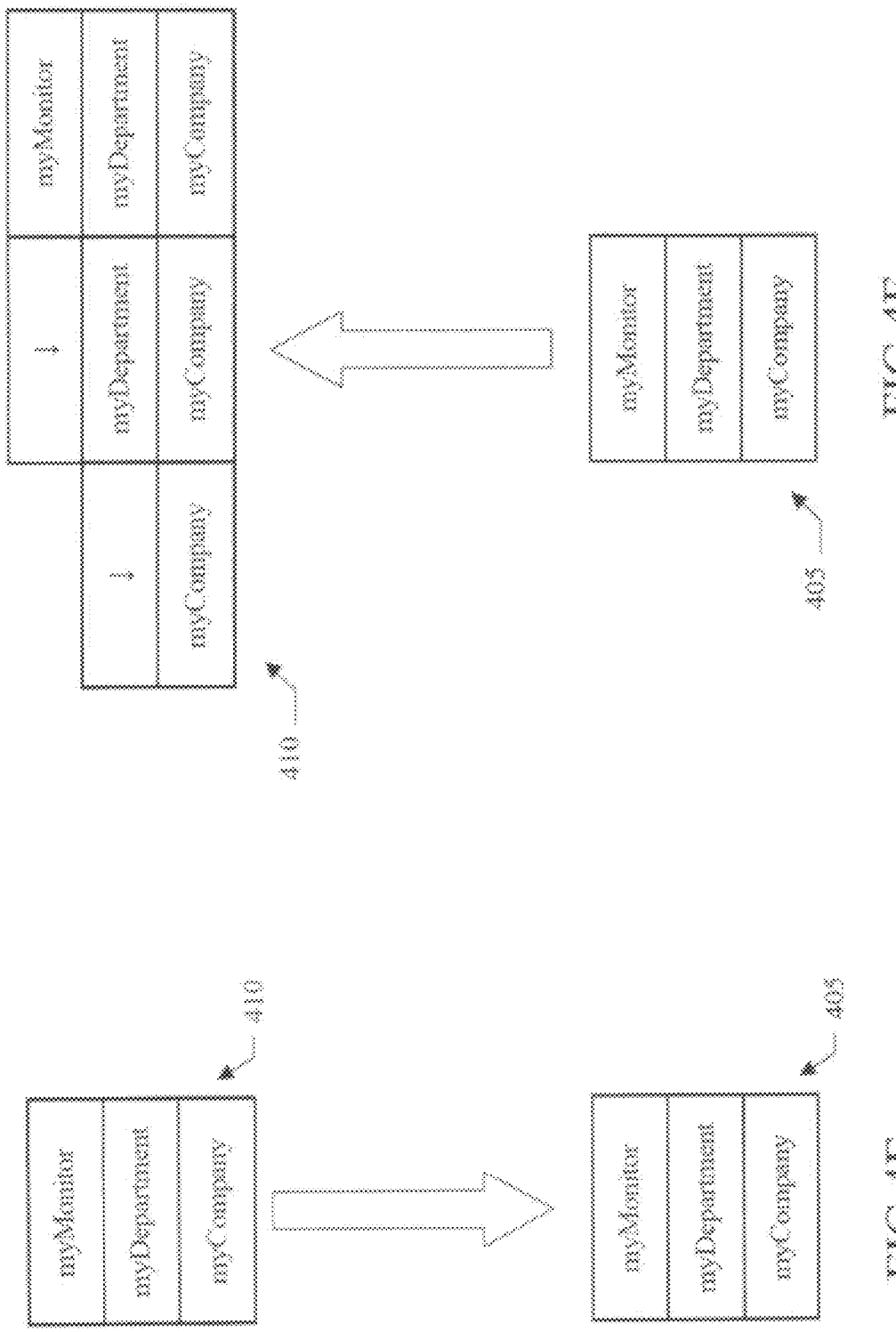

US 8,321,803 B2

AGGREGATING SERVICE COMPONENTS

PRIORITY

This application is based on the claims the benefit of priority from European Patient Application No. EP08158534.1 filed Jun. 19, 2008.

BACKGROUND

The management of generic resources (for example, of a data processing system) is a critical activity. This is particularly true in modern systems, which include a number of different types of resources (such as computers, software programs, users, and the like) with a myriad of correlations (such as locations of the computers, installations of the software programs, authorizations of the users, and the like).

Resource management operations typically involve the execution of a long series of heterogeneous basic tasks in a specific sequence. For example, in order to verify compliance in a selected environment of the installed software programs with available licenses, it may be necessary to determine the software programs installed on each computer of interest, to meter their usage, to collect corresponding usage information from the different computers, and to compare the collected usage information with the available licenses.

SUMMARY

Methods, systems, and computer program products for aggregating service components in a data processing system according to predefined aggregation rules. The method includes providing a plurality of visual elements, each visual element representing a corresponding service component: selecting a new visual element of a new service component for addition to an aggregation structure: determining a set of eligible visual elements of eligible service components among the instantiated service components: associating a visual cue with the eligible visual elements; and aggregating the new service component to a selected eligible service component of a selected eligible visual element in the aggregation structure. The new service component is compatible for aggregation with each eligible service component according to the aggregation rules. The aggregation structure includes an aggregation of instantiated visual elements of instantiated service components to define an aggregated service according to the aggregation of the instantiated service components.

One embodiment is a resource management system for aggregating service components in a data processing system according to predefined aggregation rules. The resource management system includes a container of a graphical user interface for providing a plurality of draggable widgets, each draggable widget representing a corresponding service component: a pointer for selecting a new widget of a new service component for addition to an aggregation structure of the graphical user interface: an analyzer for determining a set of eligible bricks of eligible service components among the instantiated service components, the new service component being compatible for aggregation with each eligible service component according to the aggregation rules: a rendering module for associating a visual cue with the eligible bricks; and an engine for aggregating the new service component to a selected eligible service component of a selected brick in the aggregation structure. The aggregation structure includes an aggregation of bricks of instantiated service components to define an aggregated service according to the aggregation of the instantiated service components.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1 is a schematic block diagram of a data processing system according to an embodiment of the invention.

FIGS. 2A-2I illustrate an exemplary graphical user interface according to embodiments of the invention.

FIGS. 3A-3I show an exemplary graphical user interface according to an embodiment of the invention as applied to an exemplary scenario.

FIGS. 4A-4I illustrate an exemplary data How between state matrices according to an embodiment of the invention.

DETAILED DESCRIPTION

Figure 2B:
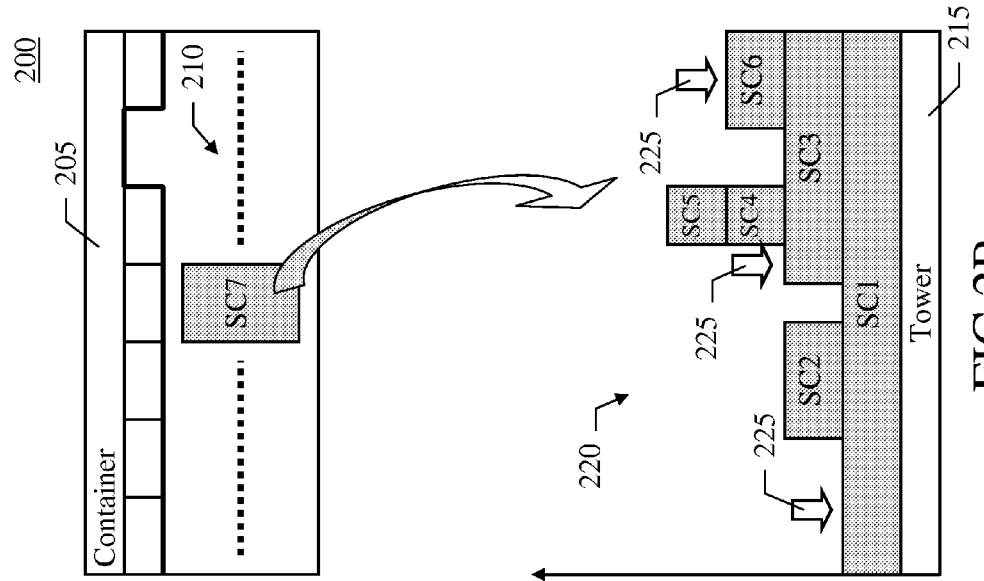

Embodiments of the invention relate to defining a resource management operation in a consistent way by simply manipulating graphical objects. With reference in particular to FIG. 1, there is provided a schematic block diagram of a data processing system 100 according to an embodiment of the invention. The system 100 may have a distributed architecture (for example, based on the Internet): particularly, the system 100 may include multiple server computers (or simply "servers") 105, which are connected to each other through a communication network 110. A client computer (or simply "client") 115 according to an embodiment of the invention may also be connected to the network 110.

More specifically, the client 115 (for example, a personal computer) may include a central unit 120, which houses the electronic circuits controlling its operation. These electronic circuits may include a microprocessor, a working memory, drives for input/output units, a network adapter (for connecting the client 115 to the network 110, for example), and the like. The client 115 is also provided with a hard-disk and a drive 125 for reading CD-ROMs and/or DVD-ROMs 130. A monitor 135 is used to display images on a screen 140. Operation of the client 115 is controlled by means of a keyboard 145 and a mouse 150, which are connected to the central unit 120 in a conventional manner.

FIGS. 2A-2I illustrate exemplary graphical user interlaces according to embodiments of the invention. Referring to FIGS. 2A-2I, the client runs a resource management application, which allows a corresponding user to manage a variety of resources of the system (for example, other computers, networks, software programs, operating systems, users, departments, and so on).

The operations used to manage the desired resources may be defined by aggregating corresponding service components: each service component defines a basic block that contributes in defining the whole resource management operation. The service component may comprise an actual executable task: in this case, the executable task may be abstracted as a service—defined by a black box that receives an input and provides a corresponding output (according to some sort of internal processing). Examples of executable tasks are queries for extracting information from databases, inventory functions for collecting information about installed software products, metering functions for determining usage of software products, compliance functions for verifying compliance with specific policies, monitoring functions for controlling system performance, and the like. Conversely, the service component may comprise a scope definition: the scope definition may be combined with other executable tasks and/or scope definitions to create an actual executable task. Examples of scope definitions are filtering criteria, operative parameters, query fragments, and so on.

Figure 2A:
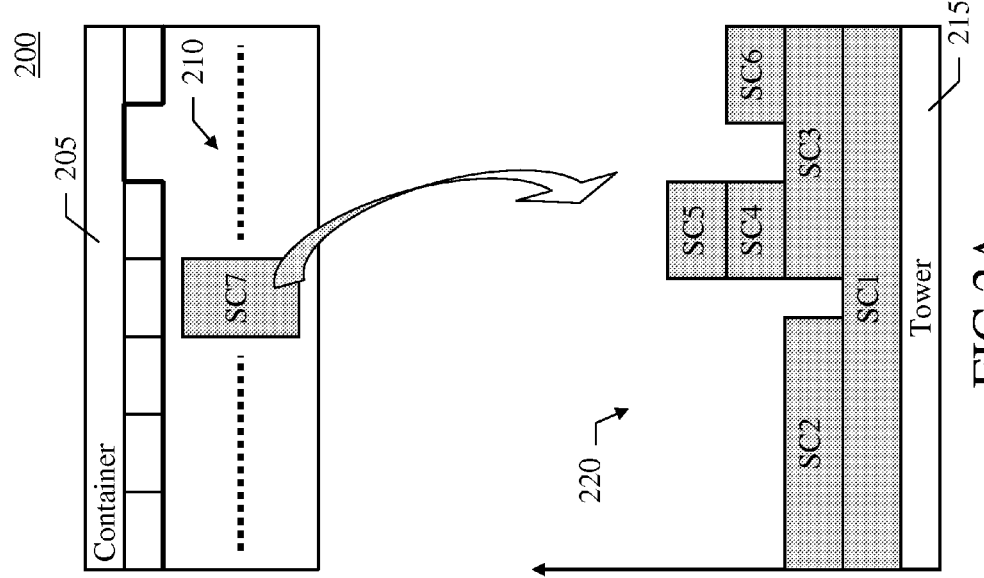

For this purpose, as shown in FIG. 2A, the resource management application implements a graphical user interface (GUI), which configures the screen of the client like a desktop 200. The desktop 200 includes a frame that defines a container 205 for all the service components that are available. The container 205 may include a tabbed pane that organizes the service components in categories (in order to facilitate their identification): for example, it is possible to have categories relating to hardware devices, software modules, persons, departments, locations, and the like.

Each service component is represented in the container 205 with a corresponding window gadget (widget) 210. The widget 210 may include a control that can be manipulated graphically to interact with the resource management application. For example, the widget 210 is depicted as an icon with a label providing a short description of the corresponding service component. A more detailed description of the service component may be displayed (such as in a pop-up window) upon the user moving a pointer indicating a current position on the desktop 200 (not shown in the figure) over the widget 210 with the mouse. The widget 210 is a draggable object, on which it is possible to act with a drag-and-drop operation: for example, this result is achieved by moving the pointer over the widget 210, clicking on it by pressing a left button of the mouse, dragging the widget 210 to a specific position with the mouse while holding the button pressed, and then dropping the widget 210 in that position by releasing the button.

The reference to the drag-and-drop operation is for illustration only. In various embodiments, selecting the new service components to be added to the tower may be carried out by simply double-clicking over their widgets, by exploiting menu commands, and the like.

For each resource management operation, the corresponding service components are aggregated—according to predefined aggregation rules—into an aggregated service. The aggregated service is defined in an aggregation structure of the GUI—for example, in the form of a tower 215. Each service component included in the aggregated service is instantiated in a corresponding context: the instantiated service component is represented in the tower 215 with a brick 220, typically including the same icon and label of the corresponding widget 210. The user can select each service component to be added to the aggregated service by moving the corresponding widget 210 to the tower 215 (with a drag-and-drop operation in the example at issue).

In one embodiment of the invention (as described in detail in the following), in response thereto there are determined the instantiated service components (if any), which are compatible for aggregation of the new service component according to the aggregation rules (hereinafter referred to as eligible service components). The bricks 220 of the eligible service components are then highlighted in the lower 215 by means of a corresponding visual cue.

In this way, the user is driven step-by-step along the definition of the desired aggregated service, for each new service component, the aggregated service in its entirety (as currently defined by all the instantiated service components in their contexts) is taken into account to determine the eligible service components. Once the new service component has been added to the aggregated service, it is in turn taken into account (in the corresponding context) to define the eligible service components for a next new service component. In other words, the aggregated service is an expandable structure, wherein the eligible service components are determined dynamically according to its current definition.

Embodiments of the invention may facilitate the definition of any desired resource management operations, even by people without specific technical skills. Embodiments of the invention may allow enforcing the logic consistency of the aggregate service automatically. Particularly, it may be possible to remove (or at least reduce) any error directly in the definition of the aggregated service (i.e. before its execution), for example, in an embodiment of the invention, the instantiated service components are arranged in one or more sequences. Each service component may be instantiated in the context of the preceding instantiated service component of the corresponding sequence (starting from an entire universe of discourse for the first instantiated service component). For example, if the instantiated service component comprises an executable task, the executable task may receive the output of the preceding executable task as input. If the instantiated service component comprises a scope definition, it may be applied to the preceding executable task or composed with the preceding scope definition. Each sequence of instantiated service components is represented in the tower 215 with a stack of the corresponding bricks 220 (ordered along a growing direction of the tower 215 indicated by a corresponding arrow in the figure). For the sake of clarity, if multiple slacks have one or more lower bricks 220 in common, they may be condensed into a single element in the tower 215. For example, the tower 215 includes three slacks, all of them starting with the brick 220 of an instantiated service component SC1. The first stack (from the left) then includes the brick 220 of an instantiated service component SC2. The other two stacks have the brick 220 of an instantiated service component SC3 in common. The second slack then includes the bricks 220 of two instantiated service components SC4 and SC5, while the third stack includes the brick 220 of an instantiated service component SC6. Therefore, the resulting aggregated service will be defined by the sequences of instantiated service components SC1, SC2, SC1, SC3. SC4, SC5 and SC1, SC3, SC6.

In this case, the eligible service components are the ones after which the new service component can be added (in the corresponding sequences). Each service component may be associated with a domain of its application and a co-domain of a corresponding result. Therefore, the new service component is considered compatible with each instantiated service component if the intersection of the co-domain of the instantiated service component with the domain of the new service component is not null. More formally, we denote with F and Fn the functions corresponding to the application of the instantiated service component and of the new service component, respectively, with D, Dn their domains, and with C, Cn their co-domains:

$F(D) u C$.

$Fn(Dn) u Cn$.

The new service component is then suitable to be added in the aggregated service following the instantiated service component, so as to generate an aggregated function:

$Fn(F(D)) u Cn$.

only if the following condition is satisfied:

C&Dn<>{}.

If the service components comprise executable tasks, the output of the instantiated service component may be compatible with the input of the new service component. The eligible service components may be determined as soon as the widget 210 of the new service component is selected (by clicking on it) for dragging to the tower 215, as shown by an arrow in the figure.

In response thereto, as shown in FIG. 2B, a drop arrow 225 may be displayed on top of the brick 220 of each eligible service component. When the eligible service component is followed by at least one instantiated service component (in one or more sequences), the brick 220 of the following instantiated service components in one of the sequences may be shrunk to expose a portion of the (hidden) brick 220 of the eligible service component (so as to create the room for the corresponding drop arrow 225). For example, a new service component SC7 is compatible with the instantiated service components SC1, SC3 and SC6. Therefore, the brick 220 of the instantiated service component SC2 (following the eligible service component SC1) and the bricks 220 of the instantiated service component SC4, SC5 (following the eligible service component SC3) are shrunk. The drop arrow 225 can then be displayed on top of the brick 220 of each eligible service component SC1, SC3 and SC6. In this way, it is possible to provide an immediate overall view of the positions where the widget 210 of any new service component can be dropped.

Figure 2D:
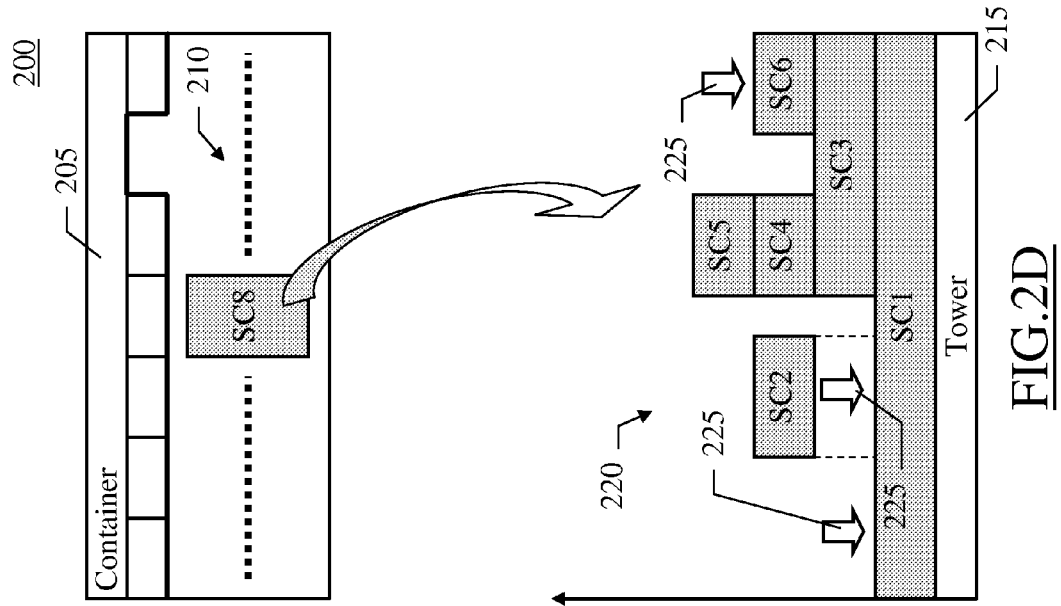
Figure 2C:
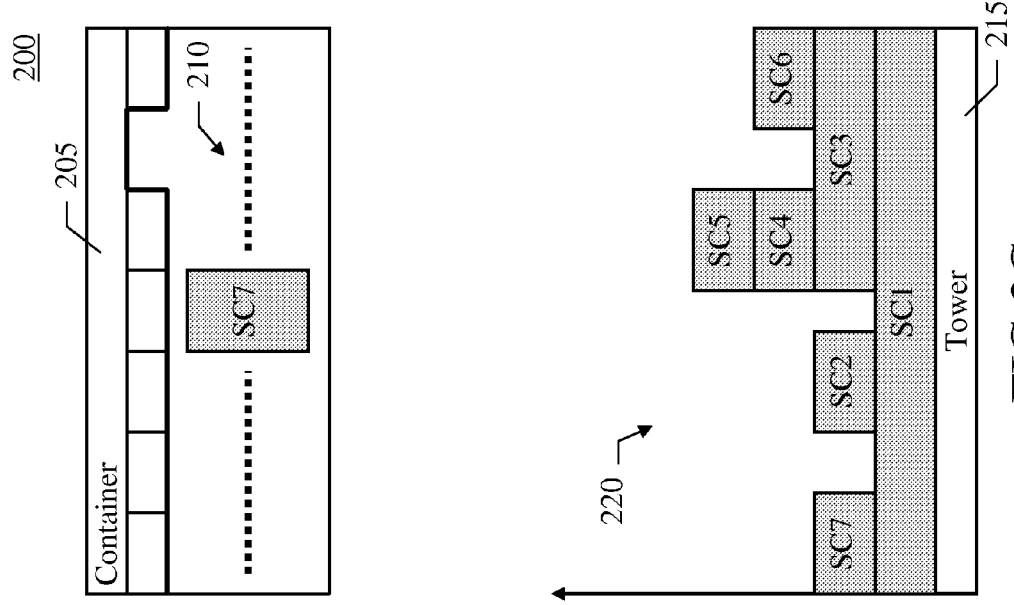
Figure 2F:
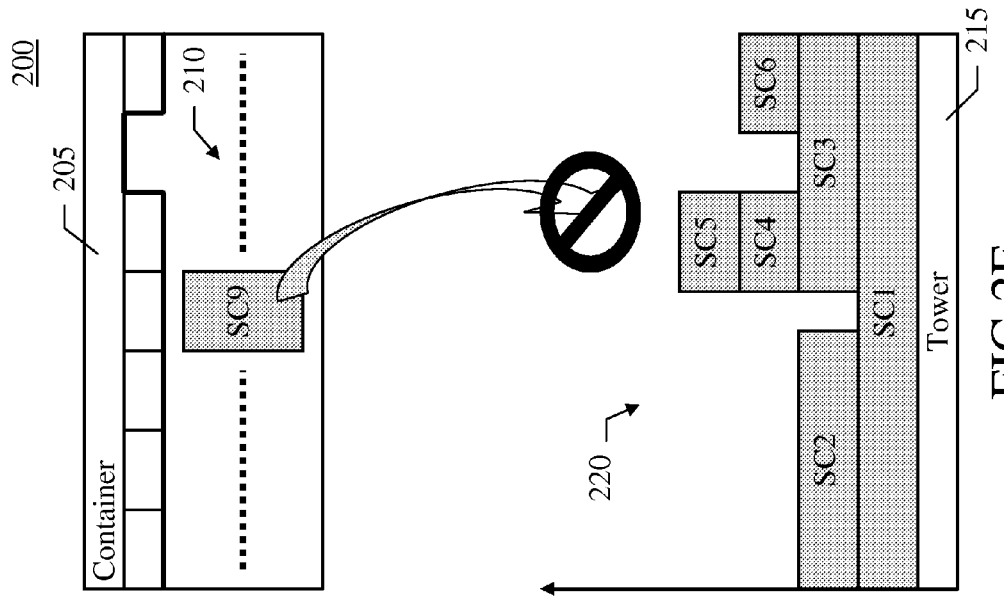

Moving to FIG. 2C, the user may select how to aggregate the new service component by dropping its widget 210 on top of a selected brick 220 of a corresponding eligible service component. If the selected brick 220 was exposed by shrinking one ore more following bricks 220 (since the selected eligible service component was followed by corresponding instantiated service components), a new sequence is added to the aggregated service. The new sequence is obtained from the corresponding (original) sequence by removing all the instantiated service components following the selected eligible service component. In any case, the new service component is added to the aggregated service following the selected eligible service component in the corresponding sequence (to indicate that the new service component has been instantiated in the context of the selected eligible service component). The lower 215 is then updated accordingly (e.g. by adding a possible new stack and in any case a new brick 220 for the new service component following the brick 220 of the selected eligible service component, with any shrunk brick 220 that returns to its original extension when it is possible), for example, the widget 210 of the new service component SC7 is dropped on top of the brick 220 of the eligible service components SC1. Therefore, a new stack (formed by the brick 220 of the single instantiated service component SC1 in common with the other stacks) is created, and a new brick 220 for the new service component SC7 is added following the brick 220 of the selected eligible service component SC1 (while the shrunk bricks 220 of the instantiated service components SC4, SC5 return to their original extensions).

As shown in FIG. 2D, there may also be determined pairs of adjacent eligible service components (in the corresponding sequences). In each pair, the new service component is compatible for addition following a preceding eligible service component of the pair and preceding a following eligible service component of the pair, for this purpose, the intersection of the co-domain of the preceding eligible service component of the pair with the domain of the new service component and the intersection of the co-domain of the new service component with the domain of the following eligible service component of the pair are both not null. In the case of service components comprising executable tasks, this means that the output of the preceding eligible service component of the pair is compatible with the input of the new service component, and the output of the new service component is compatible with the input of the following eligible service component of the pair. As above, for each pair, the bricks 220 of the instantiated service components following the brick of the preceding eligible service component of the pair (including the corresponding following eligible service component) are shrunk to expose a portion of the (hidden) brick 220 of the preceding eligible service component (so as to create the room for the corresponding drop arrow 225). The shrunk bricks 220 may also be raised to expose a further portion of the preceding eligible service component of the pair (to create the room for another drop arrow 225). For example (starting from the same situation of FIG. 2A), a new service component SC8 is compatible with the instantiated service components SC1. SC6 and with the pair of instantiated service components SC1-SC2. Therefore, the brick 220 of the instantiated service component SC2 is shrunk and raised, and the drop arrow 225 is displayed on top of the brick 220 of each eligible service component SC1 and SC6, and between the bricks 220 of the pair of eligible service components SC1-SC2.

Figure 2E:
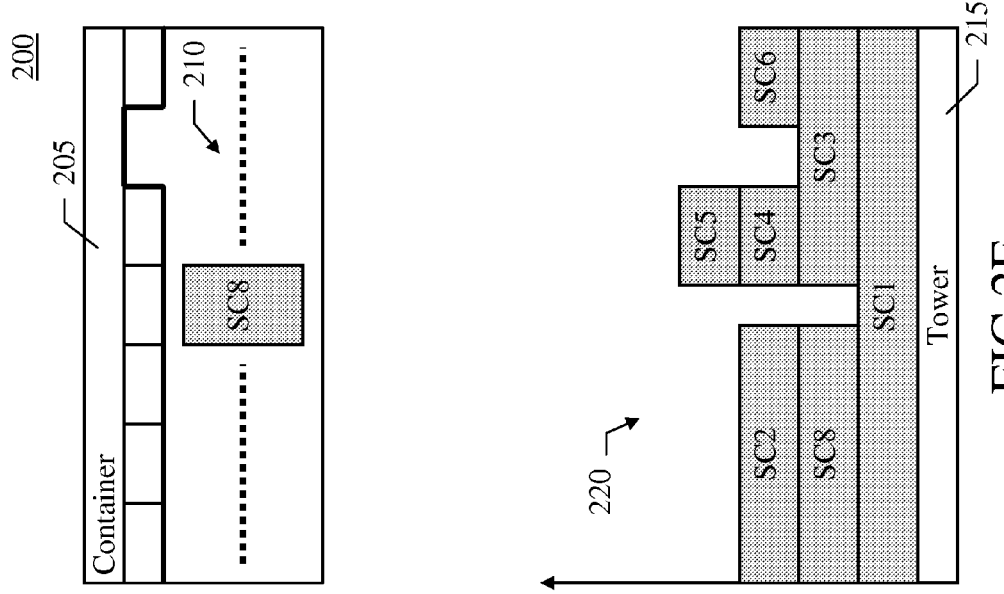

Moving to FIG. 2E, the user drops the widget 210 of the new service component between the bricks 220 of a selected pair of eligible service components. In this case, the new service component is added in the corresponding sequence following the preceding eligible service component of the selected pair (to indicate that the new service component has been instantiated in the context of this preceding eligible service component), and preceding the following eligible service component of the selected pair (to indicate that this following eligible service component is now instantiated in the context of the new service component). The tower 215 may then be updated accordingly (i.e. by adding a new brick 220 for the new service component between the bricks 220 of the selected pair of eligible service components, with any shrunk brick 220 returning to its original extension), for example, the widget 210 of the new service component SC8 is dropped between the bricks 220 of the pair of eligible service components SC1-SC2. Therefore, the shrunk bricks 220 of the instantiated service component SC2 returns to its original extension, and a new brick 220 for the new service component SC8 is added following the brick 220 of the preceding eligible service component SC1 and preceding the brick 220 of the following eligible service component SC2 of the selected pair. In this way it may be possible to add new service components in any position within the aggregated service.

Considering FIG. 2E the user may select another new service component (for addition to the same aggregated service of FIG. 2A) by dragging its widget 210 to the tower 215 (e.g. SC9). In this case, however, no instantiated service component is compatible with the new service component SC9. Therefore, the dropping of the widget 210 of the new service component SC9 on the tower 215 may be prevented (as indicated by a stop sign in the figure). This may prevent the execution of any wrong operation by the user.

With reference now to FIG. 2G, the user may also decide to remove an old instantiated service component (such as the instantiated service component SC4) from the aggregated service of FIG. 2A (for example, by dragging the corresponding brick 220 and then dropping it outside the tower 215). In response thereto (for example, as soon as the brick 220 of the old instantiated service component is selected for dragging, as shown by an arrow in the figure), the interface may verify whether service component's removal from the corresponding sequence is possible (i.e. the following instantiated service component is compatible with the preceding instantiated service component), for this purpose, the removal is considered possible if the intersection of the co-domain of the preceding instantiated service component with the domain of the following instantiated service component is not null. Particularly, in the case of service components comprising executable tasks, this means that the output of the preceding instantiated service component is compatible with the input of the preceding instantiated service component.

Referring to FIG. 2H, if the result of the verification is positive, the old instantiated service component may be removed from the corresponding sequence (so as to have its following instantiated service component directly after its preceding instantiated eligible service component). The tower 215 may be updated accordingly (i.e. by lowering the bricks 220 of all the instantiated service components following the brick 220 of the old instantiated service component by one position). In the example at issue, the brick 220 of the old instantiated service component SC4 is removed, and it is replaced by the brick 220 of the following instantiated service component SC5.

Figure 2I:
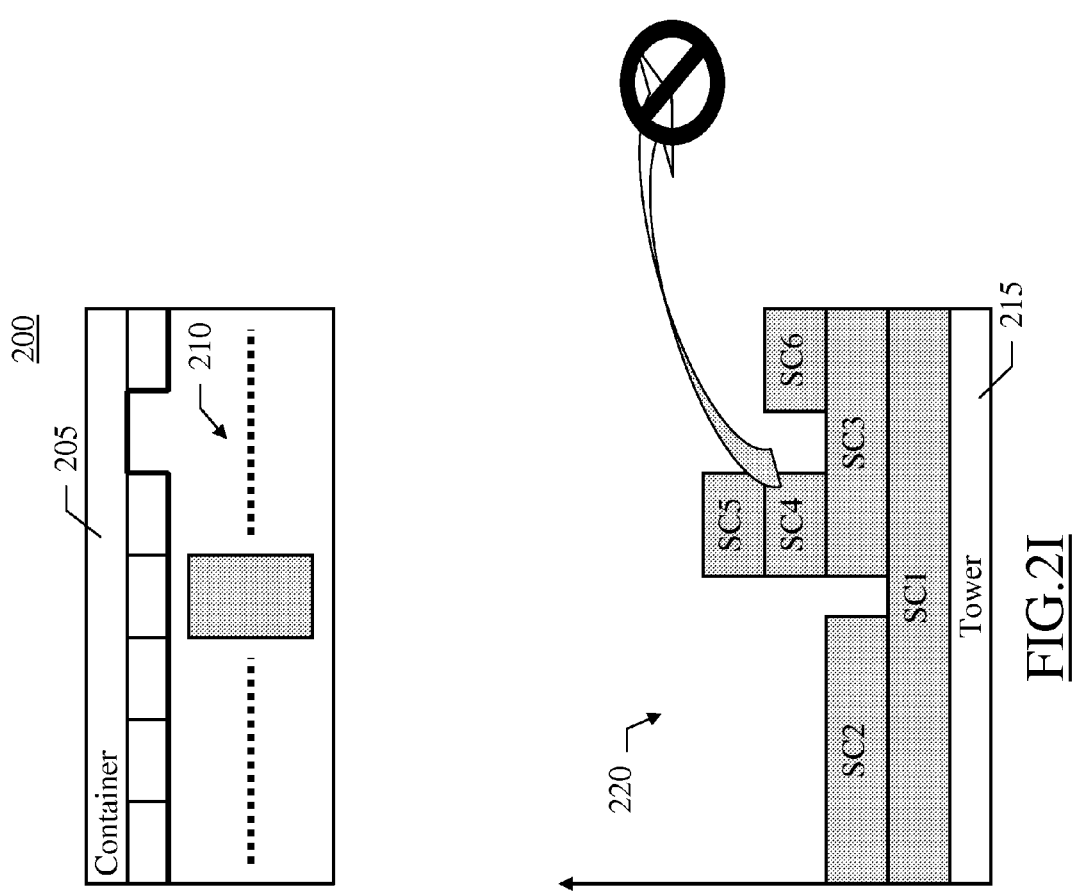

Conversely, as shown in FIG. 2I, if the result of the verification is negative, the removal of the old instantiated service component may be prevented (for example, as indicated by a stop sign in the figure). Therefore, in this case as well it is possible to avoid generating any inconsistency in the aggregated service.

FIGS. 3A-3I show an exemplary graphical user interface according to an embodiment of the invention as applied to an exemplary scenario. For example, the user of a company myCompany may be interested in monitoring the operating systems installed on the computers of a specific department myDepartment, and verifying compliance of all the computers of the company with a specific policy myPolicy. For this purpose, a service component myCompany is available to identify all the computers of the company. A service component myDepartment defines a filter for the department myDepartment. A service component myMonitor is suitable to monitor operating systems, while a service component myCompliance is suitable to verify compliance with the policy myPolicy.

Figure 3B:
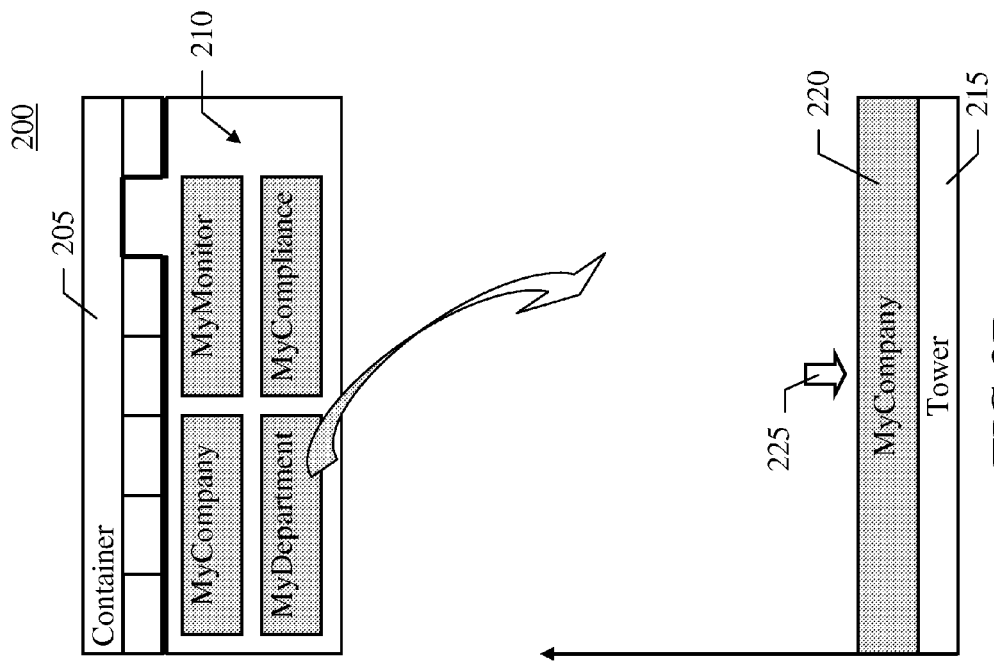
Figure 3A:
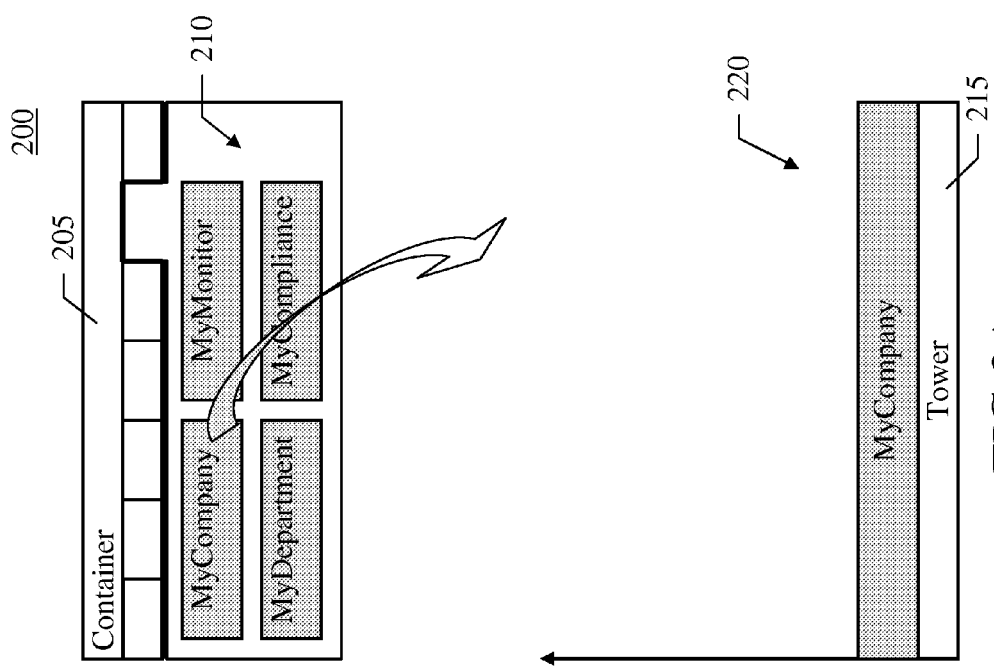

Starting from FIG. 3A, the widget 210 of the service component myCompany is dragged and dropped to the (empty) tower 215: the service component myCompany is then instantiated in the context of the whole universe of discourse (as represented by the corresponding brick 220).

Moving to FIG. 3B, the widget 210 of the service component myDepartment is dragged to the tower 215: the instantiated service component myCompany is compatible with the new service component myDepartment, so that the drop arrow 225 is displayed on lop of its brick 220.

As shown in FIG. 3C, the user drops the widget 210 of the new service component myDepartment on top of the brick 220 of the eligible service component myCompany. As a result, a new brick 220 for the new service component myDepartment is added following the brick 220 of the eligible service component myCompany.

The process continues to FIG. 3D, wherein the user selects the new service component myMonitor by dragging its widget 210 to the tower 215. In this case, both the instantiated service components myCompany and myDepartment are compatible with the new service component myMonitor (as indicated by the corresponding drop arrows 225).

Figure 3F:
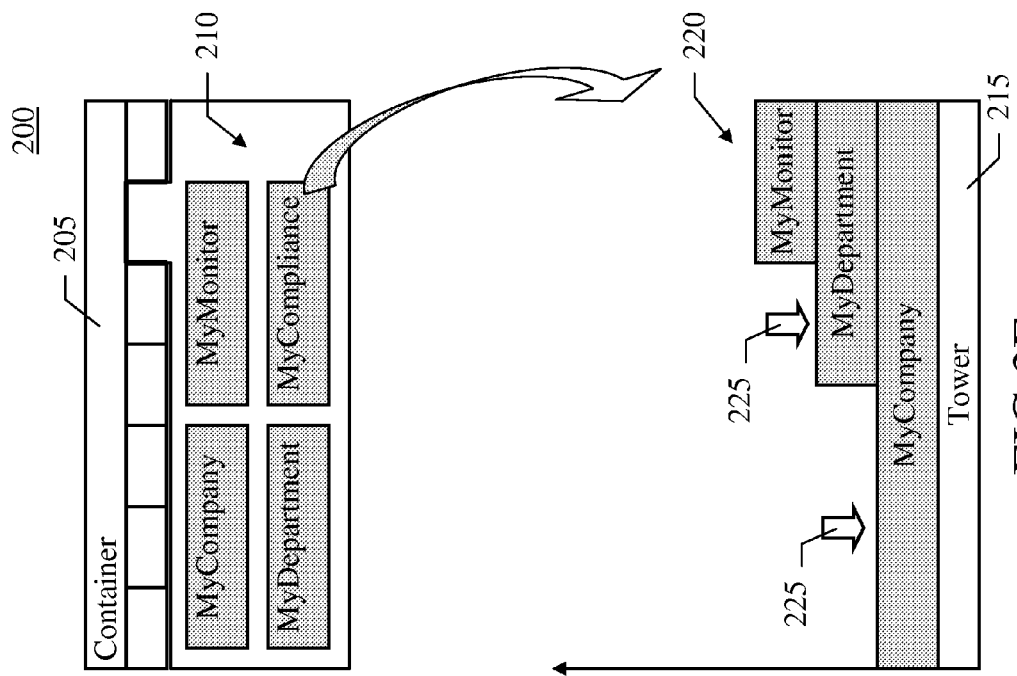
Figure 3E:
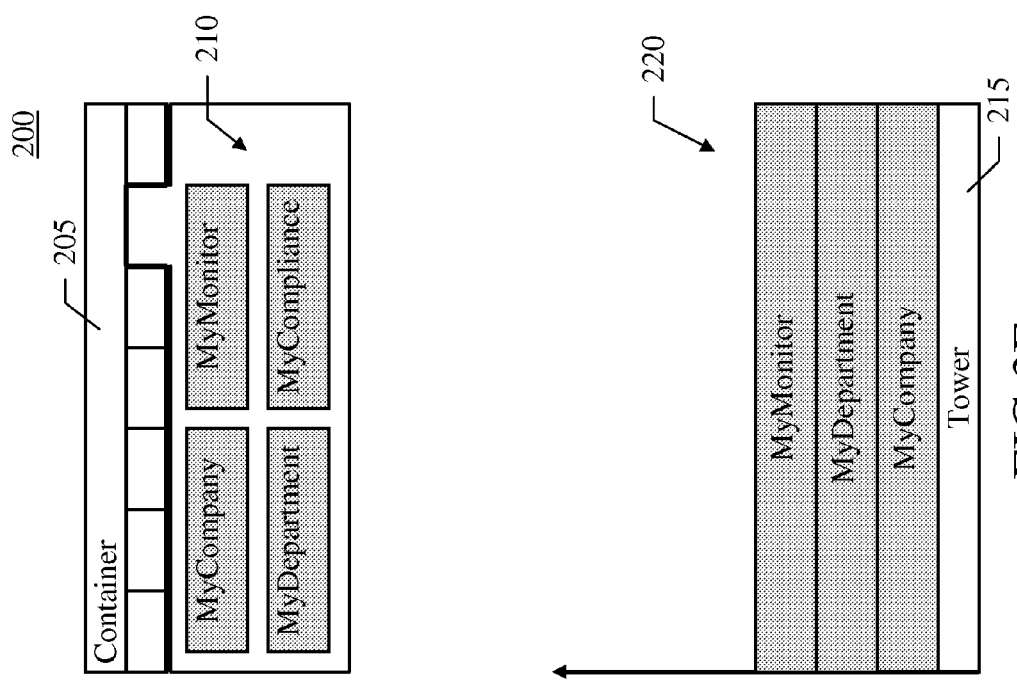

Referring to FIG. 3E, the user drops the widget 210 of the new service component myMonitor on top of the brick 220 of the eligible service component myDepartment. As a result, a new brick 220 for the new service component myMonitor is added following the brick 220 of the eligible service component myDepartment.

Moving to FIG. 3F, the user selects the new service component myCompliance by dragging its widget 210 to the tower 215. In this case, only the instantiated service components myCompany and myDepartment (but not the instantiated service component myMonitor) are compatible with the new service component myCompliance (as indicated by the corresponding drop arrows 225).

Figure 3H:
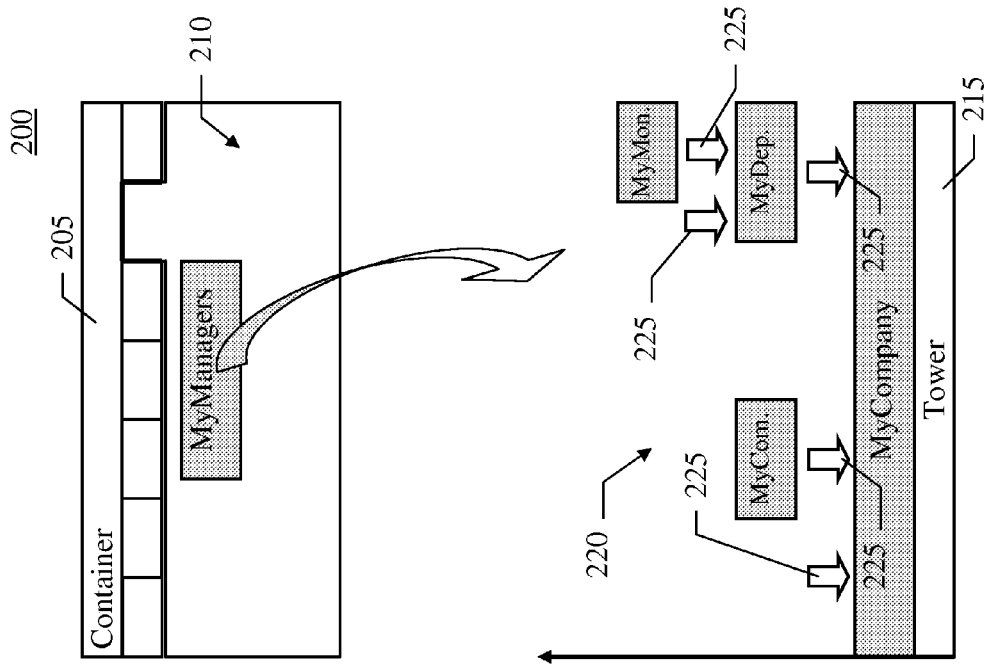
Figure 3G:
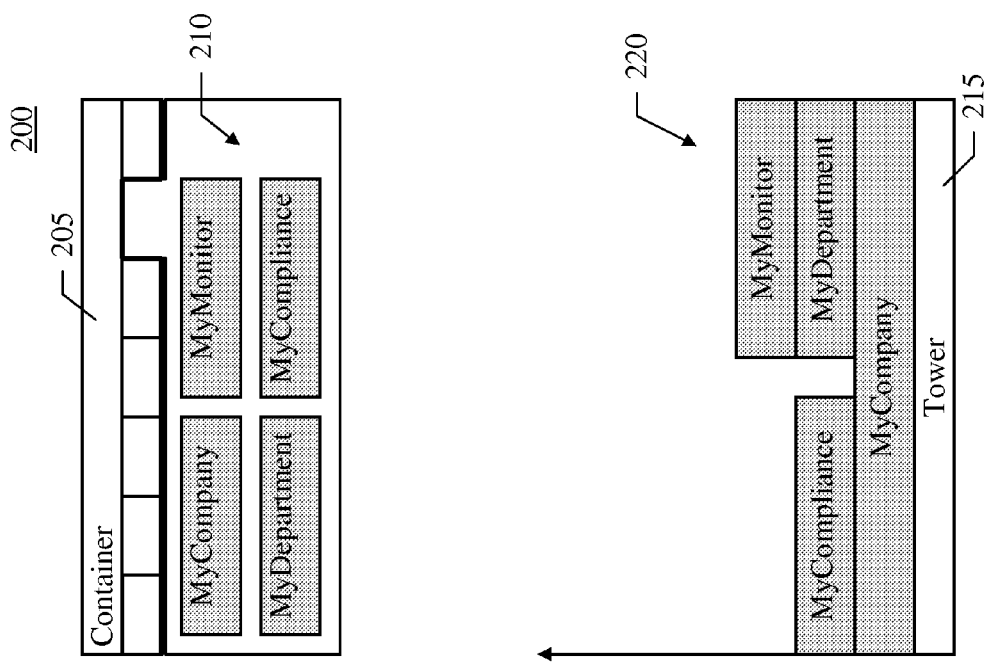

As shown in FIG. 3G, the user drops the widget 210 of the new service component myCompliance on top of the brick 220 of the eligible service component myCompany. As a result, a new column with a new brick 220 for the new service component myCompliance is added following the brick 220 of the eligible service component myCompany.

Therefore, upon the aggregated service so obtained being executed, the system will monitor the operating systems (service component myMonitor) installed on the computers of the desired department (service component my Department) of the company (service component myCompany). Also, the system will verify the compliance with the desired policy (service component myCompliance) on all the computers of the company (service component myCompany).

Later, the user realizes that compliance with the policy myPolicy is only needed for the managers of the company. Therefore, as shown in FIG. 3H, the user selects a new service component myManagers (defining a filler for the managers) by dragging its widget 210 to the tower 215. In this case, the instantiated service components myCompany, myDepartment and the pairs of instantiated service components myCompany-myDepartment. MyDepartment-myMonitor, myCompany-myCompliance are compatible with the new service component myManagers (as indicated by the corresponding drop arrows 225).

Continuing to FIG. 3I, the user selects the internal portion of the pair by dropping the widget 210 of the new service component my Managers between the bricks 220 of the pair of eligible service components myCompany and myCompliance. As a result, a new brick 220 for the new service component myManagers is added following the brick 220 of the eligible service component myCompany and preceding the brick 220 of the eligible service component myCompliance. Therefore, upon the aggregated service so obtained being executed, there will be now verified the compliance with the same policy (service component myCompliance) on the computers of the managers only (service component myManagers) of the company (service component myCompany).

The above-described shrinking of the bricks (for displaying the required drop arrows) is merely illustrative. For example, in alternative implementations it is possible to display the drop arrows laterally, directly on the bricks of the eligible service components, and the like. Other embodiments may include dropping the same widget of the new service component on top of the bricks of two of more eligible service components, adding the widget of the new service component in the same position of the brick of the selected eligible service component (to combine them in logic OR), and so on. Similar considerations apply to the addition of the widget of the new service component between the two adjacent bricks of each pair of eligible service components.

FIGS. 4A-4I illustrate an exemplary data flow between state matrices according to an embodiment of the invention. In the following, for the sake of simplicity, the widgets and the bricks will be denoted with the same references of the corresponding service components and instantiated service components, respectively.

The information defining the current structure of the aggregated service (for its rendering in the tower) may be stored in a state matrix 405. The state matrix 405 may include cells for the instantiated service components, with each one including a corresponding identifier. The cells may be arranged in columns for the sequences of instantiated service components (with rows with an increasing index along the sequences).

Figure 4B:
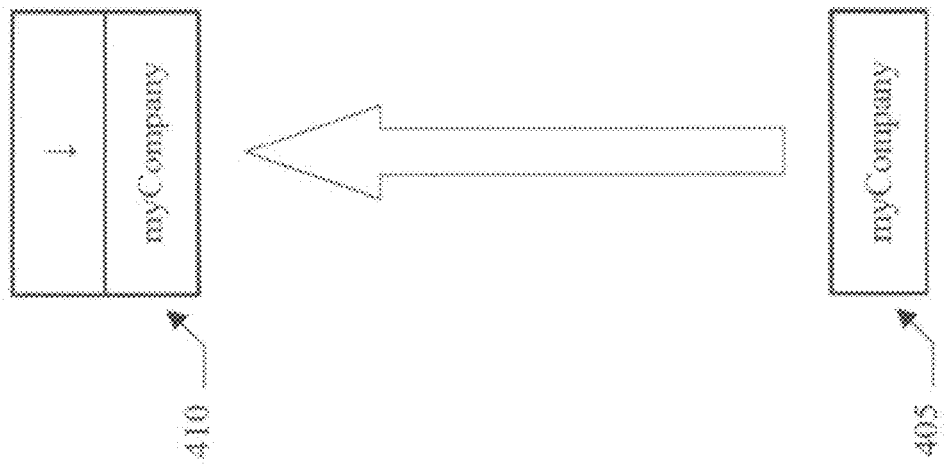
Figure 4A:
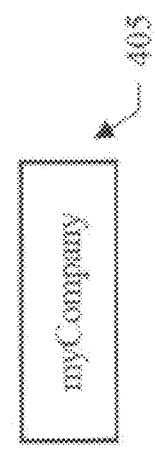

Starting from FIG. 4A, if the tower only includes the brick myCompany (see FIG. 3A) the state matrix 405 has a single cell for the corresponding instantiated service component myCompany.

Moving to FIG. 4B, a drag matrix may be used to render the tower whenever a new service component is selected for addition to the aggregated service by dragging its widget to the tower. The drag matrix 410 is built from the state matrix 405 according to the eligible service components that are determined for the new service component. A new column is added for each original column of the state matrix 405, including a cell of an eligible service component followed by one or more cells of other instantiated service components (being obtained from the original column by removing the cells of these following instantiated service components). A new cell is then added for the drop arrow, following the cell of each eligible service component. Moreover, a new cell is added for the drop arrow between the cells of each pair of eligible service components (in their original column). Upon the widget of the new service component myDepartment being dragged to the tower the instantiated service component myCompany is compatible to (see FIG. 3B), the drag matrix 410 has the same column of the state matrix 405, with the addition of a new cell for the drop arrow following the cell of the eligible service component myCompany.

As shown in FIG. 4C, upon the user dropping the widget of the new service component on a selected eligible brick, the drag matrix 410 is updated by assigning the new cell following the cell of the selected eligible service component to the new service component. All the other new cells and all the other new columns (i.e. the ones not including the cell assigned to the new service component) that were added to the state matrix 405 to build the drag matrix 410 are removed. The state matrix 405 is then replaced by this updated drag matrix 410. Upon the widget myDepartment being dropped on lop of the brick myCompany (see FIG. 3C), in the drag matrix 410, the cell of the drop arrow following the cell of the eligible service component myCompany is assigned to the new service component myDepartment (and the state matrix 405 is updated accordingly).

Continuing to FIG. 4D, upon the widget of the new service component myMonitor being dragged to the tower, both the instantiated service components myCompany and myDepartment are compatible thereto (see FIG. 3D). In this case, the drag matrix 410 has the same column of the state matrix 405, with the addition of a new cell for the drop arrow following the cell of the eligible service component myDepartment and a new column of the sole eligible service component myCompany followed by a new cell for the corresponding drop arrow.

Considering now FIG. 4E if the user drops the widget myMonitor on top of the brick myDepartment (see FIG. 3E), in the drag matrix 410, the cell of the drop arrow following the cell of the instantiated service components myCompany.myDepartment is assigned to the new service component myMonitor. The new column with the cell of the drop arrow following the cell of the eligible service component myCompany is removed. The state matrix 405 is then replaced by this updated drag matrix 410.

Moving to FIG. 4F, upon the widget of the new service component myCompliance being dragged to the tower, only the instantiated service components myCompany and myDepartment (but not the instantiated service component myMonitor) are compatible thereto (see FIG. 3F). In this case, the drag matrix 410 has the same columns of the state matrix 405, with the addition of a new column of the sole eligible service component MyCompany followed by a new cell for the corresponding drop arrow, and a new column of the instantiated service component MyCompany and the eligible service component MyDepartment followed by a new cell for the corresponding drop arrow.

Figure 4H:
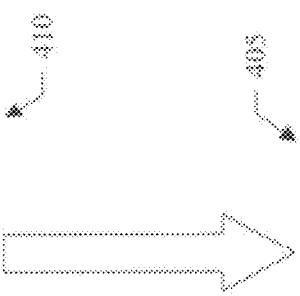
Figure 4G:
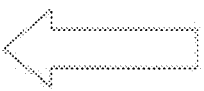

As shown in FIG. 4G, if the user drops the widget myCompliance on top of the brick myCompany (see FIG. 3G), in the drag matrix 410, the cell of the drop arrow following the cell of the eligible service component myCompany is assigned to the new service component myCompliance. The new column with the cell of the drop arrow following the cell of the instantiated service components myCompany.myDepartment is removed. The state matrix 405 is then replaced by this updated drag matrix 410.

Continuing to FIG. 4H, if the widget of the new service component myManagers is dragged to the tower, the instantiated service components myCompany, myDepartment, and the pairs of instantiated service components myCompany-myDepartment, myDepartment-myMonitor, myCompany-myCompliance are compatible thereto (see FIG. 3H). The drag matrix 410 has the same columns of the state matrix 405, with the addition of a new column of the sole eligible service component myCompany followed by a new cell for the corresponding drop arrow, a new column of the instantiated service component myCompany and the eligible service component my Department followed by a new cell for the corresponding drop arrow, and a new cell for the corresponding drop arrow between the cells (in the original column) of the pair of eligible service components myCompany-myDepartment, myDepartment-myMonitor and myCompany-myCompliance.

Figure 4I:
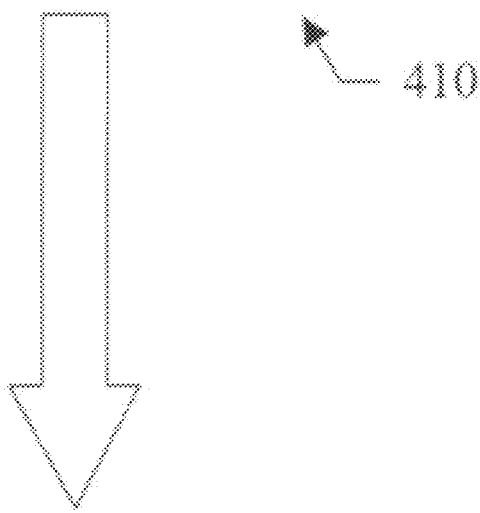

Considering now FIG. 4I, if the user drops the widget myManagers between the pair of bricks myCompany and my Compliance (see FIG. 3I), in the drag matrix 410, the cell of the drop arrow following the cell of the eligible service component myCompany and preceding the one of the eligible service component myCompliance is assigned to the new service component myManagers. The new column with the cell of the drop arrow following the cell of the eligible service component my Company, the new column with the cell of the drop arrow following the cells of the instantiated service components myCompany.myDepartment, and the new cells of the drop arrows between the cells of the pairs of eligible service components myCompany-myDepartment, myDepartment-myMonitor are removed. The state matrix 405 is then replaced by this updated drag matrix 410.

Figure 5:
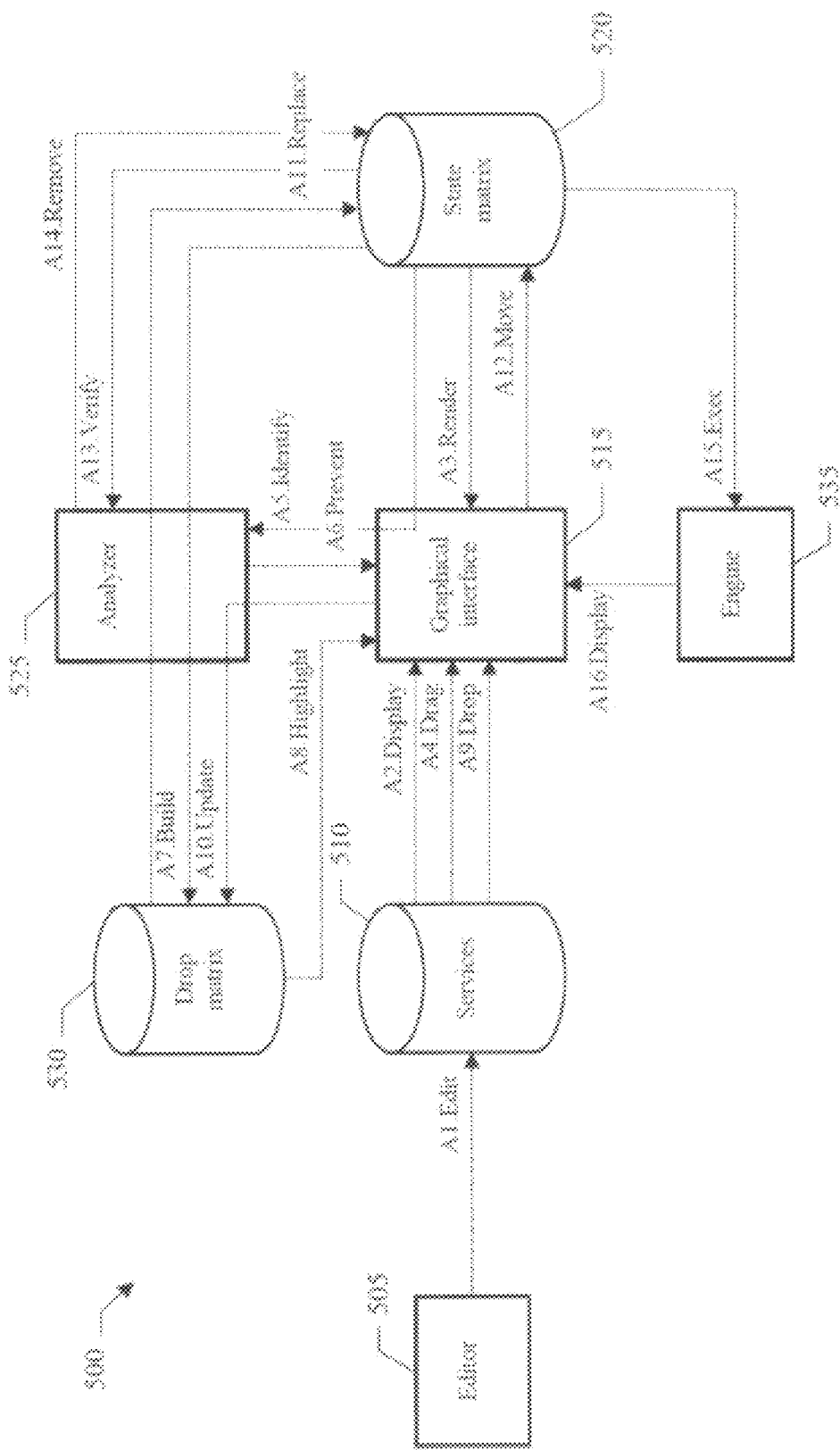
FIG. 5 depicts software components according to an embodiment of the invention.

FIG. 5 depicts software components according to an embodiment of the invention. These software components are denoted as a whole with the reference numeral 500. The information (programs and data) is typically stored on the hard-disk and loaded (at least partially) into the working memory of the client when the programs are running, together with an operating system and other application programs (not shown in the figure). The programs are initially installed onto the hard disk, for example, from DVD-ROM. Particularly, the figure describes the static structure of the system (by means of the corresponding components) and its dynamic behavior (by means of a series of exchanged messages, each one representing a corresponding action, denoted with sequence numbers preceded by the symbol "Λ").

In detail, an editor 505 may be used to create, update, delete, classify, and perform any other edit operation on the service components and the related graphical representations (for the widgets and the bricks). The definition of the service components is stored into a corresponding repository 510 (action "Λ1.Edit").

A graphical interface 515 accesses this repository 510, so as to display the widgets of the available service components in the corresponding container, organized in the different categories (action "Λ2.Display"). The state matrix (representing the instantiated services) is stored in a corresponding table 520. The graphical interface 515 also accesses the table 520 to render the bricks of the instantiated service components in the tower (action "Λ3.Render").

The user may drag the widget of a new service component towards the tower (action "Λ4.Drag"). In response thereto, an analyzer 525 identifies the eligible service components—i.e. the instantiated service components (in the table 520) that are compatible with the new service component (action "Λ5.Identify"). If no eligible service component is identified, the analyzer 525 instructs the graphical interface 515 to prevent the dropping of the widget of the new service component on the lower (action "Λ6.Prevent"). Conversely, the analyzer 525 builds the drag matrix from the state matrix (in the table 520), according to the eligible service components so identified. The system temporarily stores the drag matrix into a corresponding table 530 (action "Λ7.Build"). The graphical interface 515 accesses the table 530 to update the rendering of the tower, so as to highlight the bricks of the eligible service components by means of the corresponding drop arrows (action "Λ8.Highlight").

Assuming that at least one eligible service component has been identified, the user can drop the widget of the new service component on top of one of the bricks of the eligible service components (action "Λ9.Drop"). In this case, the analyzer 525 updates the drag matrix (in the table 530) by assigning the relevant new cell to the new service component and removing the other new columns and cells (action "Λ10.Update"). The analyzer 525 replaces the state matrix (in the table 520) with this updated drag matrix (in the table 530), which drag matrix is then deleted (action "Λ11.Replace"). The graphical interface 515 renders the tower according to the new content of the state matrix in the table 520 (same action "Λ3.Render").

In some embodiments, the user may also drag the brick of an old instantiated service component outside the tower (action "Λ12.Move"). In response thereto, the analyzer 525 may verify whether the corresponding following instantiated service component is compatible with the corresponding preceding instantiated service component. If not, the analyzer 525 may instruct the graphical interface 515 to prevent the removal of the brick of the old instantiated service component from the lower (same action "Λ6.Prevent"). The analyzer 525 updates the state matrix (in the table 520) by removing the cell of the old instantiated service component (action "Λ14.Remove"). The lower is now rendered according to the new content of the state matrix in the table 520 (same action "Λ3.Render").

Upon the definition of the aggregated service in the tower being completed, the corresponding resource management operation can be executed. The resource management operation may be executed after saving the state matrix for future reference. For this purpose, an engine 535 extracts the state matrix from the repository 520. The engine 535 aggregates the instantiated service components according to their position in the state matrix and controls the submission of the resulting executable tasks in the corresponding order (action "Λ15.Exec"). The engine 535 returns a result of the execution of the aggregated service to the graphical interface 515 for its display (action "Λ16.Display").

In order to satisfy local and specific requirements, a person skilled in the art may apply to the solution described above many logical and/or physical modifications and alterations. Although this solution has been described with a certain degree of particularity with reference to embodiment(s) thereof, it should be understood that various omissions, substitutions and changes in the form and details as well as other embodiments are possible.

It should be readily apparent that the above-described service components are merely illustrative. For example, the executable tasks may include parameters to be evaluated at run-time (for example, by entering them manually or by retrieving them automatically from environmental variables), or the scope definitions may also include instructions for their combination with other service components. Service components may consist only of executable tasks. Likewise, the service components may be aggregated according to any equivalent aggregation rules. For example, it is possible to execute the service components in parallel, to combine, correlate, and/or transform the output of the service components to obtain the input of the following service components (such as in logic NOT, OR, and the like).

The service components may be represented graphically with equivalent visual elements, such as, for example, elements of the textual type only. Moreover, it is possible to organize the widgets in various ways, such as, for example, in a tree structure or even in a simple list. Likewise, the tower may be replaced with the graphical metaphor of any other aggregation structure, such as a three-dimensional wall. Different visual cues may be used to highlight the bricks of the eligible service components (for example, by displaying them in different colors and/or shades). In different implementations, the sequences of bricks may be arranged horizontally, radially, in three dimensions, and the like. It is also possible to use multiple representations for the eligible service components (for example, to differentiate the more likely ones to be selected according to a user's past usage).

Compatibility of the new service component with the instantiated service components may be verified with other techniques as will occur to those of skill in the art (for example, according to dedicated information associated with the service components themselves). Additionally or alternatively, global rules may be used to determine the eligible service components—for example, rules based on a maximum number of specific service components that can be instantiated at the same time.

The same solution may also be implemented with a single matrix (which is updated directly in response to any drag operation and drop operation): in any case, the aggregated service may be represented with distinct arrays for its sequences, with pointer-based lists, or with any other vectors of a suitable artifact. Alternative and/or additional operations on the tower may also be implemented. For example, in various embodiments, it may be possible to remove whole columns of bricks (or pans thereof), to copy/cut and past bricks (or blocks thereof) in different positions, and so on. The old instantiated service component to be removed from the aggregated service may be selected in another way (for example, by double-clicking on its brick and then typing a delete key).

In some embodiments, the widgets of the service components that cannot be selected for addition to the tower at any moment may be temporarily disabled: it is also possible to always allow adding even new service component in the context of the whole universe of discourse.

Embodiments of the invention may be applied even if the aggregated service is executed in real-time (for example, with a preview of its result that is displayed in a dedicated frame). It is also possible to support the selecting of the bricks of specific instantiated service components to obtain partial results of the aggregated service.

Embodiments of the invention may be implemented as a stand-alone application, as a plug-in for the resource management application (or any equivalent program), or directly embedded within the resource management application. The proposed method may also be carried out on a system with a different architecture or including equivalent units. Software used to implement embodiments of the invention may be structured in various ways and may include alternative modules or functions. Embodiments of the invention may include a computer program product having computer program instructions implemented in any form suitable to be used by or in connection with any data processing system. Moreover, the program instructions may be provided on any computer-readable medium: the medium can be any element suitable to contain, store, communicate, propagate, or transfer the computer program product. Examples of such medium are fixed disks (where the program can be pre-loaded), removable disks, tapes, cards, wires, fibers, wireless connections, networks, and the like: for example, the medium may be of the electronic, magnetic, optical, electromagnetic, infrared, or semiconductor type.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for aggregating service components in a data processing system according to predefined aggregation rules, the method comprising:
    providing a plurality of visual elements, each visual element representing a corresponding service component;
    selecting a new visual element representing a new service component for addition to an aggregation structure, the aggregation structure including a set of sequences of instantiated visual elements of corresponding instantiated service components, each sequence defining an aggregated service within the aggregation structure, each instantiated visual element of each instantiated service component in each sequence comprising at least one condition selected from: preceding a following instantiated visual element of a following instantiated service component, and following a preceding instantiated visual element of a preceding instantiated service component;
    determining a set of eligible visual elements of eligible service components among the instantiated service components, the new service component being compatible for aggregation with each eligible service component according to the aggregation rules, the determining the set of eligible visual elements comprising:
        identifying one or more pairs of adjacent eligible service components, each pair of adjacent eligible service components belonging to a corresponding sequence in the set of sequences and including a preceding eligible service component and a following eligible service component that satisfy the following conditions:
            the intersection of Cp and Dn is non-empty, where Cp represents a co-domain of the preceding eligible service component and Dn represents a domain of the new service component, and
            the intersection of Df and Cn is non-empty, where Df represents a domain of the following eligible service component and Cn represents a co-domain of the new service component;
    associating, for each pair of adjacent eligible service components, a visual cue with the eligible visual elements corresponding to the adjacent eligible service components; and
    aggregating the new service component to the aggregation structure between the preceding eligible service component and the following eligible service component of a selected pair of adjacent eligible service components by inserting the new visual element between the visual element corresponding to the preceding eligible service component and the visual element corresponding to the following eligible service component.

2. The method of claim 1 wherein the selection of the new visual element is made by dragging the new visual element towards the aggregation structure; and wherein the aggregating the new service component further comprises dropping the new visual element on the visual element corresponding to the preceding eligible service component of the selected pair of adjacent eligible service components.

3. The method of claim 1 wherein the associating the visual cue with the eligible visual elements comprises updating the aggregation structure to expose at least part of the preceding visual element and at least a part of the following visual element corresponding to the preceding eligible service component and following eligible service component, respectively, of each pair, of adjacent eligible service components.

4. The method of claim 1 further comprising:
    associating the aggregation structure with a state artifact including cells for the instantiated service components arranged in vectors for the corresponding sequences, the aggregation structure being rendered according to the state artifact, wherein associating the visual cue with the eligible visual elements comprises:
        building an auxiliary artifact from the state artifact by adding a new vector to the state artifact for each original vector of the state artifact that corresponds to a sequence in the aggregation structure that includes a pair of adjacent eligible service components, each original vector including a cell corresponding to the preceding eligible service component and a cell corresponding to the following eligible service component of the pair of adjacent eligible service components, the new vector being obtained from the original vector by adding a new cell for the new service component between the cells of each pair of eligible service components; and
        rendering the aggregated structure according to the auxiliary artifact; wherein the aggregating the new service component comprises:
    updating the auxiliary artifact by assigning to the new service component the new cell between the cells of the selected pair of adjacent eligible service components, and removing the other new cells and new vectors; and
    replacing the state artifact with the updated auxiliary artifact.

5. The method of claim 1 further including:
selecting an existing visual element of an instantiated service component for removal from the aggregation structure;
verifying, in a corresponding sequence, compatibility between a following instantiated service component following the instantiated service component to be removed and a preceding instantiated service component preceding the instantiated service component to be removed; and
enabling removal of the instantiated service component from the aggregation structure according to a result of the verification.

6. The method of claim 1 further including preventing the aggregation of the new service component in response to the determination of no eligible service component.

7. The computer-implemented method of claim 1, wherein:
the preceding eligible service component and the following eligible service component of at least one pair of adjacent eligible service components and the new service component each comprise an executable task,
one or more outputs of the executable task of the preceding eligible service component are acceptable as inputs to the executable task of the new service component, and\
one or more outputs of the executable task of the new service component are acceptable as inputs to the executable task of the following eligible service component.

8. A computer program product for storing data for aggregating service components in a data processing system according to predefined aggregation rules, the computer program product comprising:
a non-transitory computer-readable medium storing computer program instructions comprising:
computer program instructions for providing a plurality of visual elements, each visual element representing a corresponding service component;
computer program instructions for selecting a new visual element representing a new service component for addition to an aggregation structure, the aggregation structure including a set of sequences of instantiated visual elements of corresponding instantiated service components, each sequence defining an aggregated service within the aggregation structure, each instantiated visual element of each instantiated service component in each sequence comprising at least one condition selected from: preceding a following instantiated visual element of a following instantiated service component, and following a preceding instantiated visual element of a preceding instantiated service component;
computer program instructions for determining a set of eligible visual elements of eligible service components among the instantiated service components, the new service component being compatible for aggregation with each eligible service component according to the aggregation rules, the computer program instructions for determining the set of eligible visual elements comprising:
computer program instructions for identifying one or more pairs of adjacent eligible service components, each pair of adjacent eligible service components belonging to a corresponding sequence in the set of sequences and including a preceding eligible service component and a following eligible service component that satisfy the following conditions:
the intersection of Cp and Dn is non-empty, where Cp represents a co-domain of the preceding eligible service component and Dn represents a domain of the new service component, and
the intersection of Df and Cn is non-empty, where Df represents a domain of the following eligible service component and Cn represents a co-domain of the new service component;
computer program instructions for associating, for each pair of adjacent eligible service components, a visual cue with the eligible visual elements corresponding to the adjacent eligible service components; and
computer program instructions for aggregating the new service component to the aggregation structure between the preceding eligible service component and the following eligible service component of a selected pair of adjacent eligible service components by inserting the new visual element between the visual element corresponding to the preceding eligible service component and the visual element corresponding to the following eligible service component.

9. The computer program product of claim 8 further comprising computer program instructions for providing a graphical user interface wherein:
the selection of the new visual element comprises dragging the new visual element towards the aggregation structure; and
the aggregation of the new service component comprises dropping the new visual element on the visual element corresponding to the preceding eligible service component of the selected pair of adjacent eligible service components.

10. The computer program product of claim 8, wherein the computer program instructions for associating the visual cue with the eligible visual elements comprise computer program instructions for updating the aggregation structure to expose at least part of the preceding visual element and at least a part of the following visual element corresponding to the preceding eligible service component and following eligible service component, respectively, of each pair of adjacent eligible service component.

11. The computer program product of claim 8, wherein:
the preceding eligible service component and the following eligible service component of at least one pair of adjacent eligible service components and the new service component each comprise an executable task,
one or more outputs of the executable task of the preceding eligible service component are acceptable as inputs to the executable task of the new service component, and\
one or more outputs of the executable task of the new service component are acceptable as inputs to the executable task of the following eligible service component.

12. A resource management system for aggregating service components in a data processing system according to predefined aggregation rules, the resource management system comprising at least one processor for controlling operations of other components of the resource management system, the other components comprising:
a container of a graphical user interface for providing a plurality of draggable widgets, each draggable widget representing a corresponding service component;
a pointer for selecting a new widget representing a new service component for addition to an aggregation structure of the graphical user interface, the aggregation structure including a set of sequences of bricks of instantiated service components, each sequence to defining an aggregated service within the aggregation structure, each instantiated visual element of each instantiated service component in each sequence comprising at least one condition selected from: preceding a following instantiated visual element of a following instantiated service component, and following a preceding instantiated visual element of a preceding instantiated service component;

an analyzer for determining a set of eligible bricks of eligible service components among the instantiated service components, the new service component being compatible for aggregation with each eligible service component according to the aggregation rules, the analyzer identifying one or more pairs of bricks, each pair of bricks corresponding to adjacent eligible service components and belonging to a corresponding sequence in the set of sequences, each pair of bricks including a brick corresponding to a preceding eligible service component and a brick corresponding to a following eligible service component that satisfy the following conditions:

the intersection of Cp and Dn is non-empty, where Cp represents a co-domain of the preceding eligible service component and Dn represents a domain of the new service component, and the intersection of Df and Cn is non-empty, where Df represents a domain of the following eligible service component and Cn represents a co-domain of the new service component;

a rendering module for associating, for each pair of bricks corresponding to adjacent eligible service components, a visual cue with the bricks of the pair of bricks; and an engine for aggregating the new service component to the aggregation structure between the preceding eligible service component and the following eligible service component of a selected pair of adjacent eligible service components by inserting a new brick between the pair of bricks corresponding to the selected pair of eligible service components.

13. The system of claim 12, wherein:

the preceding eligible service component and the following eligible service component of at least one pair of adjacent eligible service components and the new service component each comprise an executable task, one or more outputs of the executable task of the preceding eligible service component are acceptable as inputs to the executable task of the new service component, and\ one or more outputs of the executable task of the new service component are acceptable as inputs to the executable task of the following eligible service component.

\* \* \* \* \*